March 7, 1961 A. KELLY 2,973,799
VENTED RUBBERIZED FABRIC ARTICLE AND
METHOD OF MAKING SAME
Filed Dec. 18, 1957 3 Sheets-Sheet 1
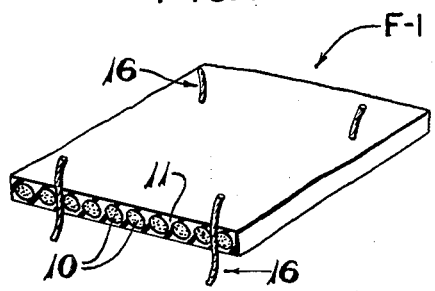
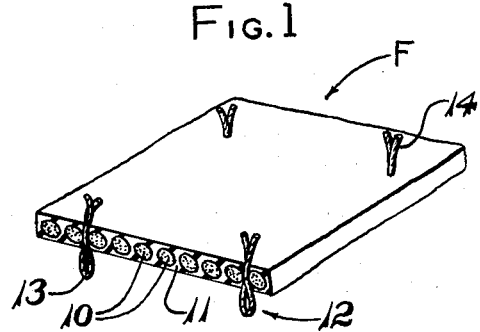
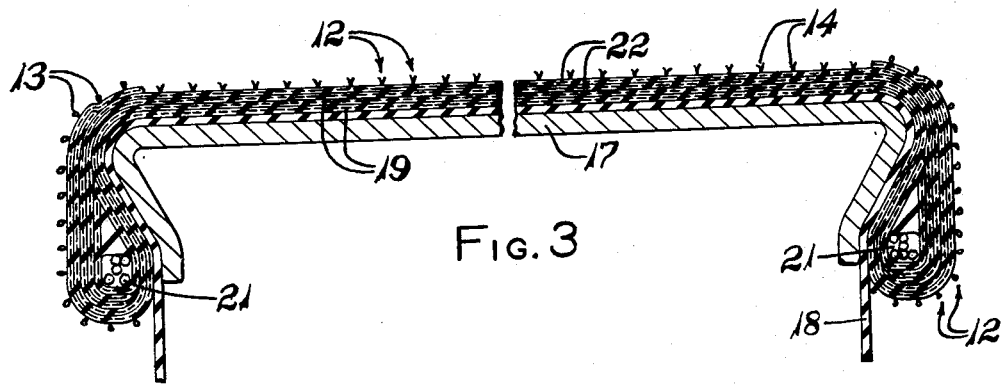
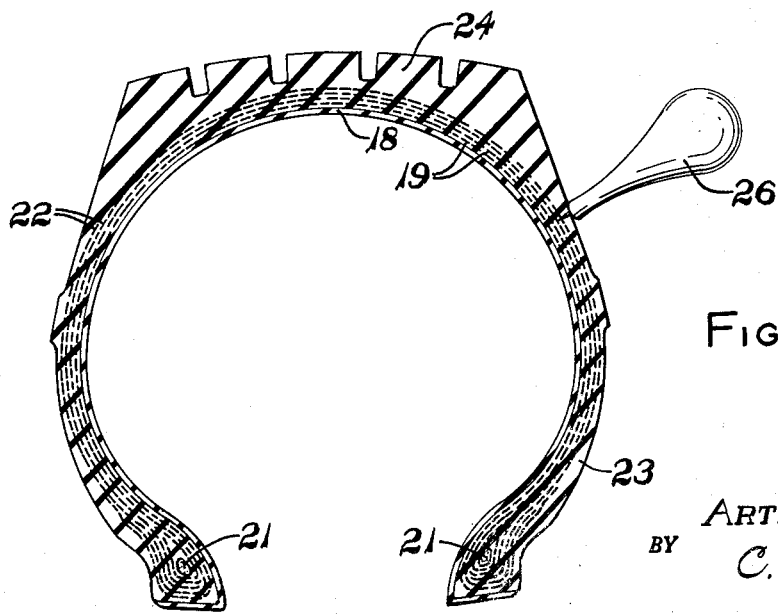
INVENTOR.
ARTHUR KELLY
BY C. E. Tripp
ATTY.

March 7, 1961
A. KELLY
2,973,799
VENTED RUBBERIZED FABRIC ARTICLE AND
METHOD OF MAKING SAME
Filed Dec. 18, 1957
3 Sheets-Sheet 2
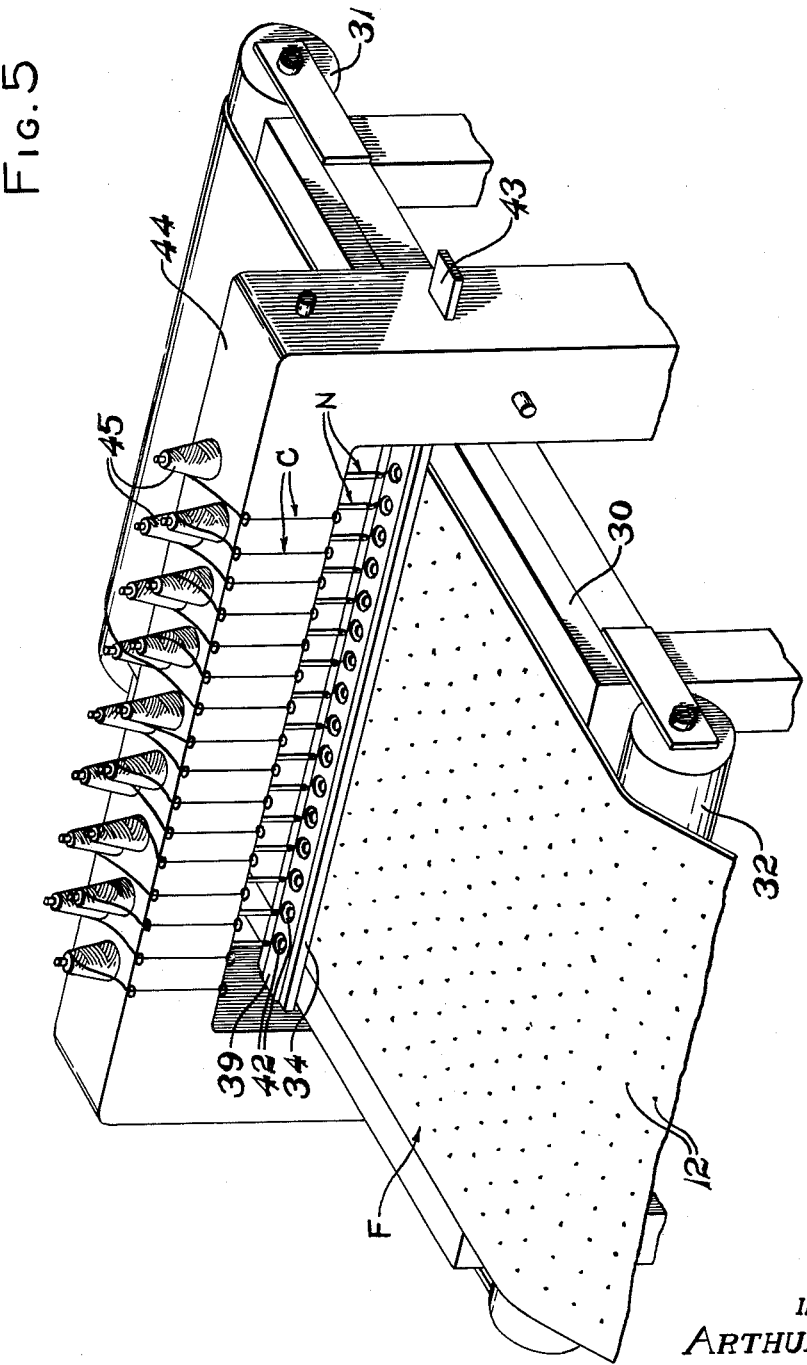
INVENTOR.
ARTHUR KELLY
BY C. E. Tripp
ATTY.

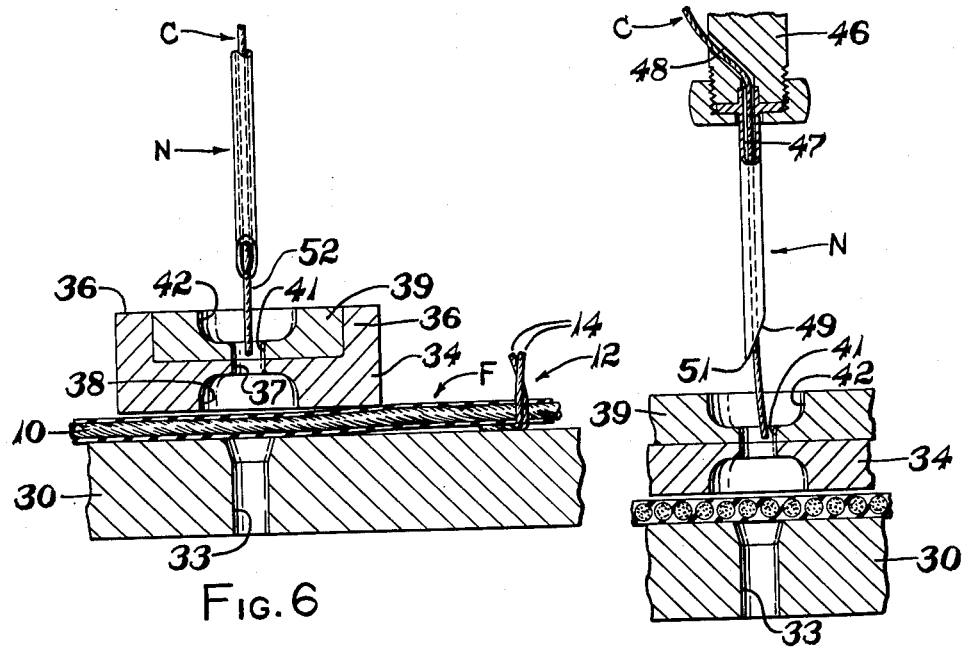
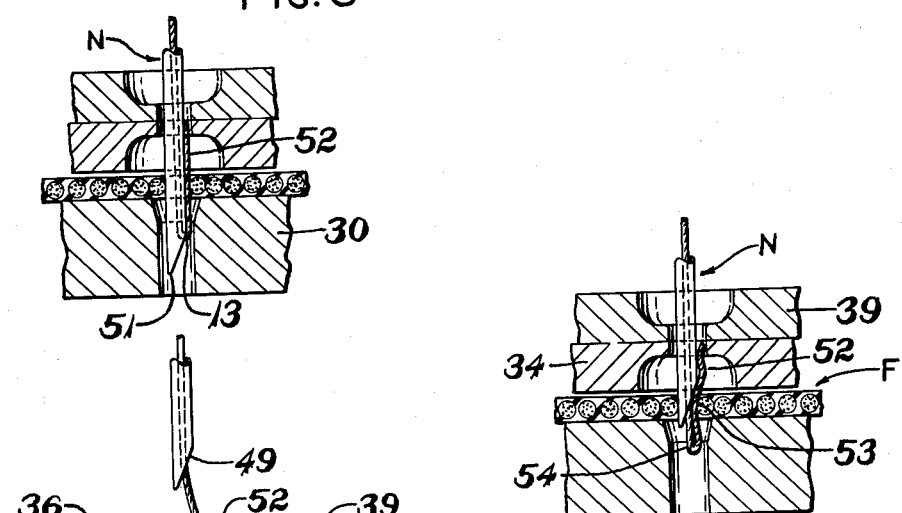
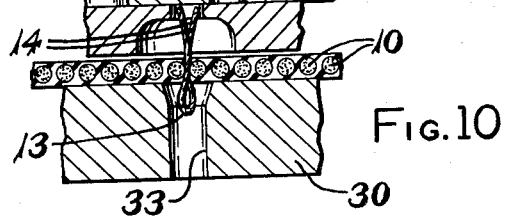

United States Patent Office 2,973,799
Patented Mar. 7, 1961

2,973,799

VENTED RUBBERIZED FABRIC ARTICLE AND METHOD OF MAKING SAME

Arthur Kelly, Akron, Ohio, assignor to The B. F. Goodrich Company, New York, N.Y., a corporation of New York Filed Dec. 18, 1957, Ser. No. 703,688

9 Claims. (Cl. 154—14)

This invention relates to the manufacture of articles formed by lamination of plies of rubberized fabric such as rubberized cord fabric. Such fabric is commonly employed in manufacture of tires, hose, belts, and many other articles. The fabric is customarily formed by masticating natural or synthetic rubber and calendering the masticated rubber directly on to elongated tension cords which are parallel to one another and disposed side by side. The rubber fills any spaces that may originally exist between the cords and also a light coat of rubber is left over the outside surfaces of the cords to form a sheet of rubberized fabric that is cut and built into the various articles referred to.

For example, in building a pneumatic tire the rubberized fabric is bias cut into cord plies. These are wrapped around and laminated upon one another on a tire building drum. During the building operation, the plies are successively stitched down to eliminate air blisters and produce initial adhesion. Often, however, air is trapped between adjacent faces of the plies and the stitching operation does not entirely expel or remove the trapped air. This may produce poor adhesion and blisters resulting in defective final products. Also, in some cases, gases are generated during the cure which if not vented may tend to cause separation between the ply laminations.

It has been proposed to remove or vent air that tends to become trapped between the plies by placing a number of parallel bleeder yarns along one surface of the plies. These yarns may or may not vent trapped air and gases to the atmosphere depending upon the manner in which the yarns terminate in the article.

In accordance with my invention, however, there is virtually immediate release of the trapped air to the atmosphere by means of short lengths of textile fibers that extend entirely through the fabric with ends that project past the faces of the fabric. When such a fabric is formed into plies, as on a tire building drum, air trapped between the plies can pass directly through the rubberized fabric plies and find its way to the atmosphere. These wicking or bleeding textile fibers are formed of relatively short lengths of material like the usual bleeding yarn, which is a soft small diameter cotton yarn that readily wicks or conducts air.

In building a laminated article formed of vented plies in accordance with this invention, although the assembled laminations are vented clear through, the venting means do not interfere with application of the plies one to the other nor with independent working of the plies relative to one another.

In the preferred form of the invention, the bleeder yarns are in the form of short loops extending through the fabric between adjacent cords. In this construction, as opposed to the prior bleeder yarn construction, trapped air and gases need not find their way to the bleeder yarn between adhered plies of fabric and then travel along the yarn between the plies to the ends of the yarn for release, rather as each ply is applied the gases will be vented directly through the outer ply to the open atmosphere. This venting or wicking action takes place without regard to the disposition of the ends or edges of the fabric plies making up the article.

The manner in which one skilled in the art may practice this invention will be apparent from the following detailed description of a preferred embodiment thereof.

In the drawings:

Fig. 1 is an enlarged partial section of a rubberized fabric embodying the invention;

Fig. 2 is a modified form wherein the venting yarns are in the form of single short pieces rather than being in the form of loops as in the form of Fig. 1;

Fig. 3 shows formation of a green pneumatic tire during the building operation on the building drum;

Fig. 4 is a cross section of a tire build up of laminated rubberized fabric, which is one example of an article that may be made from the fabric of my invention;

Fig. 5 shows diagrammatically an apparatus suitable for applying the venting yarns to the fabric;

Fig. 6 is a cross section through a work station of the apparatus; and

Figs. 7–10 show successive steps in the operation of the apparatus of Fig. 5.

Referring to Fig. 1, an enlarged fragmentary section of a piece of rubberized fabric F is shown. The fabric comprises a layer of elongated parallel cords 10 which cords are commonly formed of cotton, rayon, nylon, wire or other tensile material. The cords are coated with rubber in a calender, the rubber usually having been previously masticated to place it in a plastic state. The coat of rubber 11 not only fills any spaces that may exist between the cords, but also provides a thin layer or skin of rubber that covers the cords. The cords may or may not have been woven with small wefts to hold them in place before the calendering operation, the presence or absence of the wefts having no effect upon the invention.

In the preferred form of the invention, the venting yarns 12 of Fig. 1 are in the form of short loops of cotton yarn about .010" in diameter, the loops having a bight or looped end 13 on one side of the fabric sheet and free ends 14 on the other side of the sheet. The loops are applied so as to extend between the cords of the rubber material and the cords firmly grip the loops by friction, this being particularly true since the rubber material is somewhat tacky at this stage.

Although I prefer to use loops because the application of yarns in the form of loops facilitates the process of applying the wicking yarns, I contemplate a single short length of yarn can also be used as illustrated in Fig. 2. Here the vented fabric F1 is formed by a plurality of short lengths of wicking yarns 16 extending through the fabric and between adjacent cords.

Fig. 3 illustrates the stage in the building of a pneumatic tire wherein various plies are laid upon a tire building drum 17. If the tire is a tubeless tire, the rubber liner 18 will be laid up on the drum and two or more inner plies 19 will be successively applied to the drum. The innermost fabric ply and liner may have been joined together before application to the drum. After the inner plies are applied, the beads 21 are set. Outer fabric plies 22 are then successively applied and the ply ends are turned around the beads. As the various plies are successively laid up on the drum, air is usually trapped in spots and it is important that this trapped air be eliminated as the building operation proceeds to avoid danger of blisters and ply separation. This is done by stitching or rolling the plies together as they are applied to the drum. Since the venting yarns in the fabric of this invention lead directly from the inner face of the last applied ply directly to the atmosphere, elimination of trapped air between the faces of the plies as they are successively applied is assured, and there will be no appreciable amount of trapped air remaining in the green tire carcass at the stage shown in Fig. 3, where it is ready for application of a sidewall and tread cover.

A cured tire embodying the invention is shown in Fig. 4 although the venting yarns cannot be seen at the scale of this drawing. If it is desired to continue the venting action after the tire is cured, the sidewall rubber 23 and possibly the tread rubber 24 may be vented by any known means such as by pricking the rubber with an awl 26 or with a drum carrying a plurality of needles. Such venting means for the sidewall and tread are known and do not form part of this invention.

It will be apparent that the venting yarns of the type shown in Fig. 1 could be applied by hand by inserting short lengths of cord through the fabric between the cords with a forked tool and withdrawing the tool, but this would be a slow tedious process, so Figs. 5-10 illustrate the principles of an apparatus that will rapidly apply the looped venting yarns to the sheet of fabric from a continuous strand of yarn. Referring to Fig. 5, the apparatus is shown somewhat diagrammatically, the apparatus not being claimed, such apparatus forming the subject matter of the copending application of Cooper and Yoho, Serial No. 703,687, filed December 18, 1957. The machine includes a table 30 with fabric guide rollers 31 and 32 at opposite ends thereof, the fabric being trained from roll 31 across the table to roll 32 after which it is wound on a combination indexing and wind-up roll not shown. A transverse roll of holes 33 pierce the table, these being hidden in Fig. 5, but they appear in Figs. 6-10. A lower shear bar 34 extends across the table and is mounted to bridge the sheet of fabric F being vented. This bar has outstanding guides 36 and a row of apertures 37 in alignment with the table aperture 33 each terminating in a mouth 38. Sliding on the lower shear bar 34 is an upper movable shear bar 39 which also has a row of holes 41 symmetrical with the holes 37 on the lower bar. These holes each have an enlarged entrance mouth 42. The upper shear bar 39 has an extension 43 at one end for connection to a reciprocating mechanism, as described in the aforesaid copending application of Cooper and Yoho. Extending above the shear bars and across the table is a metal housing 44 which contains a mechanism for mounting and vertically reciprocating a row of hollow needles N, there being one needle for each group of holes on the bars and table. Strands of the venting yarn C are wound on spools 45 and guided through the hollow needles. As seen in Fig. 7, each needle is mounted in a shank 46 and has an axial aperture 47. There is also an aperture 48 in the shank for threading the yarn from the spool into the needle. The needle has a beveled tip 49 and the point of the needle is rounded as at 51 so that when the needle extends into the fabric the cords will be deflected and not pierced by the needle.

The operation of the apparatus will be described with reference to Figs. 6-10. At the beginning of an operation, the needle is positioned as shown in Figs. 6 and 7 and the fabric wind-up mechanism will have advanced the fabric to a position ready for insertion of a row of vent yarns. A length 52 of venting yarn will be depending from the needle as the result of the previous operation. The shear bar 39 will have been positioned so that its holes are in alignment with those of the lower bar and the table.

As seen in Fig. 8, the needle reciprocating mechanism is actuated to cause the needle to descend and pierce the fabric, the needle contour insuring that the needle passes between two cords. As soon as the needle enters the fabric, the length 52 is gripped between one rubber cord and the needle resulting in the sharp bend or bight 13 in the yarn at the end of the needle. Continued advance of the needle pulls the length 52 of yarn into the fabric until the descent of the needle is arrested which is the condition shown in Fig. 8. The reciprocating machine now raises the needle but as the needle is raised to a position wherein the beveled end begins to pass out of the fabric as seen in Fig. 9, the friction of the rubberized cords at zone 53 against the short length of yarn 52 and the length 54 emerging from the hollow needle holds the loop in place in the fabric. In other words, it is easier for the needle to slide over the length of yarn extending through it than it is for the needle to pull the loop of yarn back up between a pair of rubberized cords. Thus, as seen in Fig. 9, when the needle leaves the fabric, the two lengths of yarn forming the loop remain gripped at zone 53 by the fabric.

As seen in Fig. 10, when the needle has cleared the upper shear bar 39, the latter is shifted relative to the lower bar and the edges of the aperture 37 and 41 shear length 52 depending from the needle. This leaves the originally described two free lengths of yarn 14 shown in Fig. 1 joined by loop 13, and a new length of yarn 52 is left depending from the needle, which length is determined by the amount the needle is lifted before the shearing operation begins.

The upper shear bar is then returned to its alignment position, the fabric is indexed again, and the operation repeated. Since the material which the cords are embedded in is normally quite tacky, the cords are firmly gripped and will not be pulled loose during the advance of the fabric over the table and during subsequent handling.

The single lengths 16 of the vent yarn shown in Fig. 2 could be applied by hand using an ordinary eyed needle threaded with a strand that is clipped after passage of the needle through the fabric.

Thus, it can be seen that thorough venting of rubberized fabric is obtained by the fabric of my invention and that such yarns can be readily applied and will remain in place during subsequent building operations.

Having completed a detailed description of a preferred embodiment of my invention so that those skilled in the art may practice the same, I claim:

1. Fabric material for forming laminated articles, said material comprising a plurality of parallel cords disposed in sheet form and united by rubber, and a plurality of short air conducting textile fibers extending transversely through said fabric between adjacent cords of the fabric with portions of the fibers exposed on either face of the fabric.

2. Fabric material for forming laminated articles, said material comprising a plurality of parallel cords disposed in sheet form and united by rubber, and a plurality of short loops of air conducting textile fibers extending transversely through said fabric, both legs of each loop being disposed between the same pair of adjacent cords of the fabric with the bight of each loop exposed on one face of the fabric and free ends of that loop exposed on the other face of the fabric.

3. Ply material comprising a plurality of elongated parallel tension cord members, rubber calendered onto and between said cords, and a plurality of spaced short vent yarns extending through said fabric between adjacent cords with portions of each yarn exposed on either face of said fabric.

4. Ply material comprising a plurality of elongated parallel tension cord members, rubber calendered onto and between said cords, and a plurality of spaced vent yarns in the form of separate short loops extending through said fabric, both legs of each loop being disposed between the same pair of adjacent cords with the bight of a loop exposed on one face of the fabric and free ends of the loop exposed on the other face of the fabric.

5. A laminated article comprising a plurality of plies of rubberized cord fabric, each of said plies comprising elongated parallel tension cord members covered by rubber and a plurality of short air conducting textile fibers extending transversely through the fabric of each ply between adjacent cords of the fabric with portions of the fibers exposed on each face of each ply.

6. The method of providing for release of air trapped between normally impervious superposed plies of rubberized cord fabric comprising providing the fabric prior to its superposition with spaced fibrous textile vents extending completely through said fabric between the cords thereof.

7. The method of providing for release of air trapped between normally impervious superposed plies of rubberized cord fabric comprising providing the fabric prior to its superposition with spaced discrete loops of air conducting fibrous textile vents extending completely through said fabric between the cords thereof.

8. The method of preventing entrapment of air in the carcass of an inflatable vehicle tire during construction thereof comprising providing ply stock formed of parallel cords united by rubber with a plurality of spaced fibrous air-conducting yarns extending through the ply stock between the cords thereof and with portions of the yarns exposed on either face of the ply stock, and forming the tire carcass by successively superposing lengths of the ply stock upon a tire building drum and smoothing each length of ply stock as it is superposed so that air pocketed between the drum and the ply stock and between successive layers of ply stock vents through said yarns.

9. The method of preventing entrapment of air in a laminated article formed of sheets of cord-reinforced rubber during construction of the article comprising providing ply stock formed of parallel cords covered by rubber with a plurality of spaced fibrous air-conducting yarns extending through the ply stock between the cords thereof and with portions of the yarns exposed on either face of the ply stock, forming the article by successively superposing lengths of the ply stock upon a supporting surface and smoothing each length of the ply stock as it is superposed so that air pocketed between the supporting surface and the ply stock and between successive layers of ply stock vents through said yarns.

References Cited in the file of this patent

UNITED STATES PATENTS

| | | |
|---|---|---|
| 527,971 | Grubb | Oct. 23, 1894 |
| 670,412 | Tillinghast | Mar. 19, 1901 |
| 1,053,101 | Magowan | Feb. 11, 1913 |
| 1,955,083 | Muller | Apr. 17, 1934 |
| 2,186,771 | Smith | Jan. 9, 1940 |
| 2,515,847 | Winkler | July 18, 1950 |
| 2,636,460 | Seiderman | Apr. 28, 1953 |
| 2,671,494 | Coulliette | Mar. 9, 1954 |

FOREIGN PATENTS

| | | |
|---|---|---|
| 1,059,059 | France | Nov. 10, 1953 |